United States Patent
Adkins et al.

[11] Patent Number: 6,166,128
[45] Date of Patent: Dec. 26, 2000

[54] COLOR REDUCTION OF POLYMETHYLENE POLY (PHENYLISOCYANATES)

[75] Inventors: Rick L. Adkins; Clarence D. Blue, both of New Martinsville, W. Va.; Jeffrey S. Bolton, Krefeld, Germany; Kirk J. Bourgeois, Menominee, Mich.; Mark R. Kratz, League City, Tex.; Brian H. Peterson, Minneapolis, Minn.; Roger C. Suter, Friendly, W. Va.; Kenneth P. Yonek, McMurray, Pa.

[73] Assignee: Bayer Corporation, Pittsburgh, Pa.

[21] Appl. No.: 09/207,340

[22] Filed: Dec. 8, 1998

[51] Int. Cl.$^7$ .............................. C08J 3/00; C08K 3/20; C08L 75/00; C08G 18/28; C08G 18/77
[52] U.S. Cl. .................. 524/589; 524/109; 524/114; 524/590; 528/73; 560/331
[58] Field of Search .................... 524/589, 590, 524/109, 114; 560/331; 528/73

[56] References Cited

U.S. PATENT DOCUMENTS

| | | | |
|---|---|---|---|
| 2,885,420 | 5/1959 | Spiegler | 260/453 |
| 3,793,362 | 2/1974 | Kolakowski et al. | 260/453 SP |
| 3,919,166 | 11/1975 | Brachman | 260/45.8 A |
| 3,925,437 | 12/1975 | Rowton | 260/453 SP |
| 4,677,154 | 6/1987 | Narayan et al. | 524/710 |
| 4,775,558 | 10/1988 | Haas et al. | 427/373 |
| 4,814,103 | 3/1989 | Potter et al. | 252/182.22 |
| 4,904,704 | 2/1990 | Nafziger et al. | 521/156 |
| 5,208,368 | 5/1993 | Svherzer et al. | 560/333 |
| 5,312,971 | 5/1994 | Adkins et al. | 560/347 |
| 5,342,881 | 8/1994 | Müller et al. | 524/700 |
| 5,583,251 | 12/1996 | Buysch et al. | 560/347 |
| 5,726,240 | 3/1998 | Rosthauser et al. | 524/590 |

FOREIGN PATENT DOCUMENTS

| | | |
|---|---|---|
| 915846 | 11/1972 | Canada . |
| 1465014 | 2/1977 | United Kingdom . |

*Primary Examiner*—Patrick D. Niland
*Attorney, Agent, or Firm*—Joseph C. Gil; N. Denise Brown

[57] ABSTRACT

This invention relates to a process for the reduction of color of polymethylene poly(phenylisocyanates). This process comprises mixing a polymethylene poly(phenylisocyanate) with an epoxide having an epoxide equivalent weight of about 44 to about 700, and heating this mixture to a temperature of from about 35 to about 150° C. for at least about 15 minutes, with stirring. Suitable epoxides include epoxidized fatty acid monoglycerides, epoxidized fatty acid diglycerides, epoxidized fatty acid triglycerides, epoxidized dimer fatty acids and epoxidized trimer fatty acids.

11 Claims, No Drawings

COLOR REDUCTION OF POLYMETHYLENE POLY (PHENYLISOCYANATES)

BACKGROUND OF THE INVENTION

The present invention relates to a process for reducing the color of polymethylene poly(phenylisocyanate) compositions and blends thereof. This process comprises mixing a polymethylene poly(phenylisocyanate) with an epoxide, and heating this mixture to a temperature of about 35° C. for at least about 15 minutes, while stirring.

Various blends of isocyanates are known in the field of polyurethane chemistry. A component may be blended with an isocyanate to improve a particular characteristic such as, for example, the tendency to discolor. Organic isocyanates are known to discolor over time. These are, in general, colorless liquids or solids and change from light yellow to brown after as little as a few hours. Different stabilizer packages to prevent discoloration of various isocyanates, including toluene diisocyanates and diphenylmethane diisocyanates and prepolymers thereof, are known.

There are several references in which additives are used to prevent the discoloration of monomeric isocyanates, see for example, U.S. Pat. Nos. 2,885,420, 4,677,154 and 4,814,103, as well as in GB 1,465,014. All of these require that the isocyanate be obtained in a colorless or near colorless state, thereby allowing the color inhibitor to be most effective. Once an isocyanate becomes dark, these same additives do not further inhibit or reduce color formation (see, for example, DE 1,793,484). This is especially true of crude MDI (i.e., polymeric MDI), which is inherently dark and extremely difficult to reduce by treatment of the finished isocyanate. In fact, U.S. Pat. No. 5,208,368 discloses that a major disadvantage of the PMDI process is that "this discoloration can only be reduced to an inadequate extent, if at all, even by subsequent phosgenation to prepare the corresponding crude MDI, and that the crude MDI formed cannot be purified by distillation". In other words, once the color forms, it is extremely difficult to reduce it or to remove it.

Two references disclose that the color of PMDI has been reduced by treating the finished PMDI. These are U.S. Pat. Nos. 5,312,971 and 5,583,251. Both of these references describe treating PMDI under strong reducing conditions. In U.S. Pat. No. 5,583,251, PMDI is treated with hydrogen at high temperatures (200° C.) in the presence of a hydrogenation catalyst to obtain color reductions of up to 50% for the absorbance at 430 nm and up to 77% for the absorbance at 520 nm. In U.S. Pat. No. 5,312,971, PMDI treated with a strong chemical reducing agent (i.e., borane: tetrahydrofuran complex) gave mixed results. The 430 nm absorbance decreased by 21% but the 520 nm absorbance increased by 27%.

U.S. Pat. No. 2,885,420 describes stabilizing agents which can be added to organic monomeric isocyanates which have been distilled in quantities of from 0.01% to 0.5% by weight to prevent discoloration of the isocyanates. These stabilizing agents are essentially colorless compounds of the following group: aliphatic, aromatic and cycloaliphatic ethers and thioethers and mixtures of this group of compounds. These compounds are essentially non-reactive with organic isocyanates under ordinary atmospheric conditions and/or react slowly in the absence of a catalyst. This group of compounds stabilizes the organic monomeric isocyanates against discoloration, even in the presence of oxygen, moisture or light.

U.S. Pat. No. 4,677,154 describes a stabilizer package comprising 2,6-di(t-butyl)-p-cresol (BHT) and a second compound may be added to a thermoplastic polyurethane reaction mixture in quantities of from 0.01 to 1% by weight, based on the weight of the isocyanate, to eliminate discoloration in the resultant polyurethane. The second compound of the stabilizer package is selected from various phosphite, diphosphonites, substituted phenols, etc. The reaction mixture also comprises 4,4'-methylene diphenyl diisocyanate, a polyol selected from the group consisting of polyester polyols and polyoxyalkylene polyether polyols, and a short chain extender. This stabilizer package is suitable for use to prevent discoloration of polyurethanes based on various isocyanates including aliphatic, cycloaliphatic, arylaliphatic and aromatic isocyanates, including polymeric polyisocyanates such as polymethylene poly(phenylene polyisocyanate).

Similarly, U.S. Pat. No. 4,814,103 describes the use of a hindered phenol, such as, for example, BHT and aliphatic epoxides to prevent discoloration of prepolymers based on monomeric MDI, especially MDI with a high 2,4'-monomer content. The hindered phenols must be added to the 2,4-rich MDI immediately after distillation, while the epoxide can be added then or later along with the co-reactants for preparing the prepolymer.

A process for improving the storage stability of diphenylmethane diisocyanates is also described in GB 1,465,014. This process comprises storing refined diphenylmethane diisocyanate in intimate admixture with glycidol. Suitable diphenylmethane diisocyanates include the 2,2'-isomer, the 2,4'-isomer and the 4,4'-isomer, and mixtures thereof. It is also possible that trace quantities of related triisocyanates such as, for example, 2,4'-di-(p-isocyanobenzyl)phenyl isocyanate as well as other impurities such as ureas, carbodiimides, uretonimines, etc. are present in minimal amounts. The quantity of glycidol is typically from 0.001 to 0.25% by weight of the isocyanate. It is also possible that glycidol be used in combination with an organic solvent such as, for example, toluene, dimethyl phthalate, acetone, etc. The isocyanate can be dissolved in the solvent, the glycidol added to that solution and the solvent removed, or the glycidol can be added to the diisocyanate as a solution in a small amount of an inert solvent.

All of these patents are directed to stabilization of polyurethane compounds against discoloration. Most polymeric MDI mixtures are highly colored when they are manufactured. In fact, many of these products are residues and thus, the reproducibility and standardization of these polymeric MDI blends is cumbersome.

Fire-retardant polyurethanes and polyurea-urethanes having improved processability and color stability are disclosed by U.S. Pat. No. 3,919,166. These comprise the reaction product of an organic compound having active hydrogen-containing groups that are reactive with isocyanate groups, an organic polyisocyanate, and 2,3-dibromo-2-butenediol-1,4, and, optionally, a long chain a-olefin epoxide. In another embodiment, the long chain a-olefin epoxide can be melt-blended in after the product is formed. These polyurethane compositions are described as having improved stability against deterioration resulting from exposure to heat or to sunlight or ultraviolet light. The addition of the epoxide to the reaction mixture effectively inhibits discoloration and facilitates processing of the polyurethanes.

Epoxides are also disclosed as effective stabilizers against thermolysis and contact discoloration in polyurethane-forming mixtures by U.S. Pat. No. 4,775,558. These polyurethane-forming mixtures comprise an organic polyisocyanate, a high molecular weight isocyanate reactive material, a catalyst and an epoxide as a stabilizer. Suitable epoxides have equivalent weights of between 57 and 10,000, and are used in amounts of 0.01 to 50 parts by weight, based on 100 parts by weight of polyether polyol.

A method of treating toluene diisocyanate distillation residues is disclosed by U.S. Pat. No. 4,904,704. This method comprises treating the residues with at least about 0.5 equivalents, based on hydrolyzable chloride concentration of the residues, of an epoxy compound at a temperature of from about 155 to 220° C. This results in a treated distillation residue having a hydrolyzable chloride level of less than about 800 ppm. These TDI distillation residues are useful for producing rigid foams.

A process for the standardization and stabilization with simultaneous increase of reactivity of organic polyisocyanates is described by U.S. Pat. No. 5,342,881. This process comprises mixing an organic polyisocyanate at 20 to 150° C. with a) 0.01 to 10% by weight, based on the polyisocyanate, of an organic compound corresponding to a specified formula which contains at least one epoxide group, and b) 0.01 to 1% by weight, based on the polyisocyanate, of a silylated acid corresponding to the specified formula therein.

U.S. Pat. No. 5,208,368 discloses the preparation of mixtures of diphenylmethane diisocyanates and polyphenylpolymethylene polyisocyanates of reduced iodine color number. This process for the preparation of crude MDI of reduced iodine color number by reacting the corresponding crude MDA with phosgene in the presence of at least one inert organic solvent at elevated temperature, removing excess phosgene and solvent when the phosgenation is complete, and heating the reaction product which comprises incorporating monohydric or polyhydric polyoxyalkylene alcohols in an effective amount into the reaction mixture when the phosgenation is complete. This addition of monohydric and/or polyhydric polyoxyalkylene alcohols can substantially reduce the iodine color number of crude MDI, for example, to values of less than 60, preferably of from 35 to less than 20.

U.S. Pat. Nos. 3,793,362 and 3,925,437 relate to methods of reducing the acidic impurities in organic polymeric isocyanates. U.S. Pat. No. 3,793,362 describes a process to reduce the acid content and hydrolyzable chlorine content by mixing polymethylene poly(phenyl-isocyanate), PMDI, with from about 0.25 to 1.0 epoxy equivalents of a monomeric epoxide compound, for each equivalent of acid present in the PMDI. Suitable monomeric epoxide compounds contain at least one epoxy group present in a substituent attached to an aliphatic, cycloaliphatic or aromatic hydrocarbon, or have two terminal epoxy groups separated by the residue of a polyoxyalkylene glycol having a molecular weight of from about 100 to 700.

It is disclosed by U.S. Pat. No. 3,925,437 that the acidity of methylene-bridged polyphenyl polyisocyanate mixtures can be reduced by mixing the isocyanate mixture with a lower alkylene oxide compound that contains from 2 to 4 carbon atoms per molecule. In this process, the mixing may occur at ambient temperatures or in the presence of heat.

DE 1,793,484 also discloses that the addition of epoxides to polymeric MDI stabilizes the reactivity of the polymeric MDI by reducing the acidity. Epoxides are added to the polymeric MDI in amounts of from 0.15 to 3% by weight, based on the weight of polymeric MDI. This reference also states that color stabilization of colorless isocyanates can be attained by addition of epoxides. Epichlorohydrin, styrene oxide, bisphenol A diglycidyl ether, and N,N-(diepoxypropyl)aniline are disclosed as suitable epoxides. However, the addition of epoxides to dark colored isocyanates, such as, for example, polymethylene poly (phenylisocyanate (i.e., PMDI), does not reduce the color of these isocyanates.

Mixtures of various groups of epoxides and polymethylene poly(phenylisocyanate) blends is disclosed by U.S. Pat. No. 5,726,240. The addition of these epoxides is disclosed as stabilizing the reactivity of the polyisocyanate blends such that it is no longer dependent on the acidity of the polyisocyanate blend. This reference broadly discloses that suitable mixtures comprise a) 90 to 99.5% by weight of polymethylene poly(phenyl-isocyanate) blends, and b) 0.5 to 10% by weight of epoxides having an epoxide equivalent weight of about 44 to 400.

According to the present invention, it is now possible to reduce the color of polymethylene poly(phenylisocyanate) blends by mixing with an epoxide, and heating this mixture to a minimum temperature of 35° C. for at least about 15 minutes. The advantage of the present invention is a significant reduction in polymethylene poly(phenylisocyanate) color under mild conditions. These conditions are relatively mild in comparison to other methods known and described in the literature and prior patents as set forth above. The above background information illustrates the difficulty of decreasing the color of PMDI once it forms in the final polymeric isocyanate. It also demonstrates the usefulness of the present invention. By simply adding small amounts of epoxides to the final polymeric isocyanate, significant color reductions can be achieved under mild conditions. The processing advantages of the present invention over the techniques disclosed in U.S. Pat. Nos. 5,312,971 and 5,583, 351 are obvious: mild reagents, low temperatures, and low pressure (atmospheric). The present process allows for color reductions in treating the final polymeric isocyanate which are similar to those disclosed in U.S. Pat. No. 5,583,251 to be achieved, and better than those in U.S. Pat. No. 5,312, 971.

SUMMARY OF THE INVENTION

This invention relates to a novel process for the reduction of color in polymethylene poly(phenylisocyanates). This process comprises (1) mixing (a) from about 97 to 99.999% by weight, based on the combined weight of (a) and (b), of a polymethylene poly(phenylisocyanate) composition having a functionality of about 2.1 to about 3.5, an NCO group content of from about 30% to about 33%, and a monomer content of from about 30% to about 90% by weight, wherein the content of the monomer comprises up to about 5% by weight of the 2,2'-isomer, from about 1% to about 20% by weight of the 2,4'-isomer and from about 25% to about 65% by weight of the 4,4'-isomer, based on the entire weight of the isocyanate composition, or blends thereof; and (b) from about 0.001 to 3% by weight, based on the combined weight of components (a) and (b), of an epoxide having an epoxide equivalent weight of from about 44 to 700; and (2) heating the mixture to a temperature from about 35 to 150° C. for at least about 15 minutes while stirring the mixture. Suitable epoxides are selected from the group consisting of (i) epoxidized fatty acid monoglycerides, (ii) epoxidized fatty acid diglycerides, (iii) epoxidized fatty acid triglyericides, (iv) epoxidized dimer fatty acids, (v) epoxidized trimer fatty acids and (vi) mixtures thereof.

In a preferred embodiment of the present process, the invention comprises mixing (a) from about 98 to 99.96% by weight, more preferably about 99 to about 99.8% by weight, base on the combined weight of components of (a) and (b), of a polymethylene poly(phenylisocyanate), and (b) from about 0.04% to 2% by weight, more preferably about 0.2 to about 1% by weight, based on the combined weight of components (a) and (b), of an epoxide having an epoxide equivalent weight of from about 44 to 700. In addition, it is preferred that the mixture is heated to a temperature from about 40° C. to about 100° C., more preferably from about 50° C. to about 70° C., for preferably about 15 to 240 minutes, more preferably about 30 to 120 minutes while stirring the mixture.

DETAILED DESCRIPTION OF THE INVENTION

Suitable isocyanates for the presently claimed invention are polymethylene poly(phenylisocyanate) compositions and/or blends thereof having a functionality of from about 2.1 to about 3.5, preferably 2.3 to 3.0 and most preferably of 2.6 to 2.8, and an NCO group content of about 30% to about 33%, preferably about 30.5% to about 32.5%, and a monomer content of from about 30% to about 90% by weight, preferably from about 40% to about 70%, wherein the content of monomer comprises up to about 5% by weight of the 2,2'-isomer, from about 1 to about 20% by weight of the 2,4'-isomer, and from about 25 to about 65% by weight of the 4,4'-isomer, based on the entire weight of the composition. Blends of these compositions are also suitable. The polymeric MDI content of these isocyanates varies from about 10 to about 70% by weight, preferably from about 30% to about 60% by weight.

Polymeric MDI as used herein, refers to the three-ring and/or higher ring products derived by the phosgenation of aniline-formaldehyde condensation products.

Preferred isocyanates include, for example, polymethylene poly(phenylisocyanate) compositions having an average functionality of from about 2.5 to about 3.0, preferably about 2.6 to about 2.8, an NCO group content of about 30 to 32% by weight, and a monomer content of from about 40 to 50% by weight, wherein the content of monomer comprises no more than about 1% by weight of the 2,2'-isomer, from about 2 to about 10% by weight of the 2,4'-isomer and from about 35 to about 45% by weight of the 4,4'-isomer, based on the entire weight of the composition. This isocyanate composition comprises from about 50 to about 60% by weight of polymeric MDI. Blends of these preferred isocyanate compositions are also suitable for use in the present invention.

Another preferred polymethylene poly(phenylisocyanate) composition has a functionality of from 2.2 to 2.4, an NCO group content of from about 31.2 to about 32.8% by weight, and a monomer content of from about 55% to about 80%, wherein the content of monomer comprises no more than about 3% by weight of the 2,2'-isomer, from about 15% to about 20% by weight of the 2,4'-isomer and from about 40% to about 55% by weight of the 4,4'-isomer, based on the entire weight of the isocyanate composition. This polyisocyanate composition comprises from about 20 to about 45% by weight of polymeric MDI. Blends of this composition are also suitable.

Also suitable are mixtures of polyisocyanate compositions or blends thereof as described above with adducts of MDI including, for example, allophanates of MDI as described in, for example, U.S. Pat. Nos. 5,319,053, 5,319,054 and 5,440,003, the disclosures of which are herein incorporated by reference, and carbodiimides of MDI as described in, for example, U.S. Pat. Nos. 2,853,473, 2,941,966, 3,152,162, 4,088,665, 4,294,719 and 4,244,855, the disclosures of which are herein incorporated by reference.

Any chemical compound which contains the epoxide (oxirane) functionality is suitable in the preparation of the mixtures of the present invention. The term "epoxide" or "epoxy" as used herein refers to any organic compound or resin comprising at least one group comprising a three membered oxirane ring. The epoxide equivalent weight (EEW) range of suitable epoxides is from about 44 to 700, preferably 100 to 350 and most preferably 150 to 300. Both aromatic and aliphatic polyepoxides may be used, and are well known.

It is somewhat less preferred that the epoxy comprises an aromatic polyepoxide due to the tendency of them to cause yellowing as well as their reduced efficacy. Examples of such aromatic polyepoxides include but are not limited to those selected from the group consisting of the polyglycidyl ethers of polyhydric phenols; glycidyl esters of aromatic carboxylic acids; and mixtures thereof.

Also, suitable epoxides for use in the present invention include the epoxidized dimer and trimer fatty acids, which are formed by epoxidizing the products of the polymerization of $C_{18}$ unsaturated fatty acids such as oleic acid, linoleic acid, linolenic acid, elaidic acid and the like. The use of a dimer or trimer fatty acid entity furnishes a higher molecular weight epoxide that is less likely to volatilize from the finished articles that the polyisocyanate compositions of the present invention are used to produce. The dimer fatty acid may have an acyclic, monocyclic, or bicyclic structure or comprise a mixture of compounds having different such structures.

Epoxidized mono-, di- and triglycerides prepared by epoxidation of the known unsaturated or partially unsaturated glycerides are preferred. The epoxidized glycerides may be prepared from any of the known fatty acid triglycerides available from natural or synthetic sources. The fatty acid group, which is connected to glycerol by an ester bond is usually a $C_6$–$C_{24}$ monocarboxylic acid (linear or branched; saturated, monoun-saturated, or polyunsaturated). Such fatty acids and their equivalents are readily available at low cost from natural sources such as edible triglycerides. Specific illustrative fatty acids suitable for use include, but are not limited to, eicosanoic (arachidic) acid, heneicosanoic acid, docosanoic (behenic) acid, elaidic acid, tricosanoic acid, tetracosanoic (lignoceric) acid, caprylic acid, pelargonic acid, capric acid, caproic acid, lauric acid, palmitic acid, stearic acid, oleic acid, cetoleic acid, myristic acid, palmitoleic acid, gadoleic acid, erucic acid, rincinoleic acid, linoleic acid, linolenic acid, myristoleic acid, eleostearic acid, arachidonic acid, or mixtures or hydrogenated derivatives of these acids. The fatty acids may be derived synthetically or from natural sources such as triglyceride lipids. Mixtures of fatty acid entities, such as the mixtures of fatty acids typically obtained by hydrolysis (splitting) of a triglyceride are also suitable. These fatty acid triglycerides include, but are not limited to, fats and oils such as tallow, soybean oil, cottonseed oil, coconut oil, palm kernel oil, corn oil, fish oil, lard, butterfat, olive oil, palm oil, peanut oil, safflower seed oil, cocoa butter, sesame seed oil, rapeseed oil, sunflower seed oil, as well as fully or partially hydrogenated derivatives and mixtures of these triglycerides. Epoxidized linseed oil is particularly preferred.

In accordance with the present invention, it is preferred that hindered phenols are absent from the mixture comprising a polymethylene poly(phenylisocyanate) blend and an epoxide of the specified epoxide equivalent weight.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts and percentages are parts by weight and percentages by weight, respectively.

EXAMPLES

Isocyanate A:

A 131 equivalent weight polymeric isocyanate mixture having an average functionality of about 2.8, and containing about 40% monomeric 4,4'-MDI, about 3% monomeric 2,4'-MDI and 2,2'-MDI, and about 57% by weight higher molecular weight homologues of the MDI series. The viscosity of the mixture was about 200 mPa·s at room temperature and the acidity was 203 ppm.

Isocyanate B:

A 134 equivalent weight polymeric isocyanate mixture having an average functionality of about 2.7, and containing about 40% monomeric 4,4'-MDI, about 2% monomeric 2,4'-MDI and 2,2'-MDI, and about 58% by weight higher molecular weight homologues of the MDI series. The viscosity of the mixture was about 200 mPa·s at room temperature and the acidity was 300 ppm.

Epoxy A:

An epoxidized linseed oil having an epoxide equivalent weight of about 180, commercially available as Epoxol 9-5 from American Chemical Service, Inc.

Experimental Procedure

Varying amounts of Epoxy A were added to 100 parts by weight of an Isocyanate to prepare the mixtures as shown in the Tables below. These mixtures were heated to a temperature ranging from about 25° C. to about 150° C., and maintained at this temperature for about 2 hours, with stirring. The samples were then analyzed by UVNis spectroscopy at 430nm and 520nm. The absorbance at each wavelength for each sample is shown in the Tables set forth below.

TABLE 1

Effect of Epoxy A on Isocyanate A Color at 40 to 50° C.

| Examples | Weight % Epoxy A | 430 nm Absorbance | 520 nm Absorbance |
| --- | --- | --- | --- |
| 1A | 0.0 | 0.17 | 0.029 |
| 1B | 0.04 | 0.147 | 0.026 |
| 1C | 0.08 | 0.127 | 0.025 |
| 1D | 0.12 | 0.121 | 0.024 |
| 1E | 0.16 | 0.120 | 0.024 |
| 1F | 0.2 | 0.117 | 0.023 |
| 1G | 0.5 | 0.102 | 0.019 |
| 1H | 0.8 | 0.101 | 0.019 |
| 1J | 1.5 | 0.098 | 0.018 |
| 1K | 2.5 | 0.096 | 0.017 |

TABLE 2

Effect of Epoxy A on Isocyanate A Color at 25° C.

| Example | Weight % Epoxy | 430 nm (brown) | 520 nm (gray) | Brown Decrease (%) | Gray Decrease (%) |
| --- | --- | --- | --- | --- | --- |
| 2A | 0.0 | 0.173 | 0.026 | — | — |
| 2B | 0.04 | 0.163 | 0.024 | 5.8% | 7.7% |
| 2C | 0.2 | 0.137 | 0.022 | 20.8% | 15.4% |
| 2D | 0.5 | 0.130 | 0.021 | 24.9% | 19.2% |
| 2E | 2.5 | 0.12 | 0.019 | 27.7% | 26.9% |
| 2F | 3.0 | 0.125 | 0.019 | 27.7% | 26.9% |

TABLE 3

Effect of Epoxy A on Isocyanate A Color at 40° C.

| Example | Weight % Epoxy | 430 nm (brown) | 520 nm (gray) | Brown Decrease (%) | Gray Decrease (%) |
| --- | --- | --- | --- | --- | --- |
| 3A | 0.0 | 0.170 | 0.029 | — | — |
| 3B | 0.04 | 0.147 | 0.026 | 13.5% | 10.3% |
| 3C | 0.2 | 0.117 | 0.023 | 31.2% | 20.7% |
| 3D | 0.5 | 0.102 | 0.019 | 40.0% | 34.5% |
| 3E | 2.5 | 0.096 | 0.017 | 43.5% | 41.4% |

TABLE 4

Effect of Epoxy A on Isocyanate B Color at 25° C.

| Example | Wt. % Epoxy | 430 nm (brown) | 520 nm (gray) | Brown Decrease (%) | Gray Decrease (%) |
| --- | --- | --- | --- | --- | --- |
| 4A | 0.0 | 0.321 | 0.052 | — | — |
| 4B | 1.0 | 0.295 | 0.049 | 8.1% | 5.8% |
| 4C | 3.0 | 0.275 | 0.047 | 14.3% | 9.6% |

TABLE 5

Effect of Epoxy A on Isocyanate B Color at 40° C.

| Example | Wt. % Epoxy | 430 nm (brown) | 520 nm (gray) | Brown Decrease (%) | Gray Decrease (%) |
| --- | --- | --- | --- | --- | --- |
| 5A | 0.0 | 0.399 | 0.067 | — | — |
| 5B | 0.04 | 0.361 | 0.063 | 9.5% | 6.0% |
| 5C | 0.2 | 0.357 | 0.062 | 10.5% | 7.5% |
| 5D | 0.5 | 0.350 | 0.062 | 12.3% | 7.5% |
| 5E | 2.5 | 0.335 | 0.059 | 16.0% | 11.9% |
| 5F | 3.0 | 0.335 | 0.063 | 16.0% | 6.0% |

TABLE 6

Effect of 2% by Weight Epoxy A on PMDI Color at Different Temperatures

| Example | Isocyanate | Temp. (° C.) | 430 nm (brown) | 520 nm (gray) | Brown Decrs. (%) | Gray Decrs. (%) |
| --- | --- | --- | --- | --- | --- | --- |
| 6A | Iso B | 25 | 0.399 | 0.067 | — | — |
| 6B | Iso B | 60 | 0.328 | 0.058 | 17.8% | 13.4% |
| 6C | Iso B | 150 | 0.326 | 0.057 | 18.3% | 14.9% |
| 6D | Iso A | 25 | 0.177 | 0.025 | — | — |
| 6E | Iso A | 60 | 0.130 | 0.020 | 26.6% | 30.0% |
| 6F | Iso A | 150 | 0.122 | 0.019 | 31.1% | 31.6% |

It is evident from the information set forth in the tables above that temperature affects the color reduction. In other words, a higher temperature gives a greater color reduction. It is also evident that most of the color reduction occurs when adding less than 1% by weight of epoxide to the polymethylene poly(phenylisocyanate).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for reducing the color of polymethylene poly(phenylisocyanate) comprising:

(1) mixing
- (a) from 97 to 99.999% by weight, based on 100% by weight of components (a) and (b), of a polymethylene poly(phenylisocyanate) composition or a blend thereof having a functionality of about 2.1 to about 3.5, an NCO group content of from about 30% to about 33%, and a monomer content of from about 30% to about 90% by weight, wherein the content of the monomer comprises from up to about 5% by weight of the 2,2'-isomer, from about 1% to about 20% by weight of the 2,4'-isomer, and from about 25% to about 65% by weight of the 4,4'-isomer, based on the entire weight of the isocyanate composition; and
- (b) from about 0.001 to 3% by weight, based on 100% by weight of components (a) and (b), of an epoxide having an epoxide equivalent weight of from about 44 to about 700, said epoxide being selected from the group consisting of (i) epoxidized fatty acid monoglycerides, (ii) epoxidized fatty acid diglycerides, (iii) epoxidized fatty acid triglycerides, (iv) epoxidized dimer fatty acids, (v) epoxidized trimer fatty acids and (vi) mixtures thereof; and (2) heating said mixture to a temperature of from about 35° C. to about 150° C. for at least about 15 minutes while stirring said mixture.

2. The process of claim 1, wherein (a) from about 98 to about 99.96% by weight, based on the 100% by weight of components (a) and (b), of a polymethylene poly(phenylisocyanate) composition or a blend thereof, is mixed with (b) from about 0.04 to about 2% by weight, based on 100% by weight of components (a) and (b), of an epoxide.

3. The process of claim 2, wherein the mixture is heated to a temperature of from about 40 to about 100° C. for about 15 to about 240 minutes.

4. The process of claim 1, wherein (a) from about 99 to about 99.8% by weight, based on the 100% by weight of components (a) and (b), of a polymethylene poly(phenylisocyanate) composition or a blend thereof, is mixed with (b) from about 0.2 to about 1% by weight, based on 100% by weight of components (a) and (b), of an epoxide.

5. The process of claim 4, wherein the mixture is heated to a temperature of from about 50 to about 70° C. for about 30 to about 120 minutes.

6. The process of claim 1, wherein said polymethylene poly(phenylisocyanate) composition or blend thereof has a functionality of 2.3 to 3.0, an NCO group content of about 30 to 33% and a monomer content of from about 40 to 70% by weight.

7. The process of claim 6, wherein said polymethylene poly(phenylisocyanate) composition or blend thereof has a functionality of about 2.5 to 3.0, an NCO group content of about 30 to 32%, and a monomer content of from about 40 to 50% by weight, wherein monomer comprises no more than about 1% by weight of the 2,2'-isomer of MDI, from about 2 to about 10% by weight of the 2,4'-isomer of MDI and from about 35 to 45% by weight of the 4,4'-isomer of MDI, based on the entire weight of the composition.

8. The process of claim 1, wherein said polymethylene poly(phenylisocyanate) composition or blend thereof has a functionality of from 2.2 to 2.4, an NCO group content of from about 31.2 to abut 32.8%, and a monomer content of from about 55 to about 80% wherein the monomer content comprises no more than about 3% by weight of the 2,2'-isomer of MDI, from about 15 to about 20% by weight of the 2,4'-isomer of MDI and from about 40 to 55% by weight of the 4,4'-isomer of MDI, based on the entire weight of the composition.

9. The process of claim 1, wherein said epoxide has an epoxide equivalent weight of 100 to 350.

10. The process of claim 9, wherein said epoxide has an epoxide equivalent weight of from 150 to 300.

11. The process of claim 10, wherein said epoxide comprises epoxidized linseed oil.

* * * * *